March 16, 1971 B. G. PRICE 3,570,103
GLASS METER INSTALLING DEVICE
Filed Nov. 12, 1968
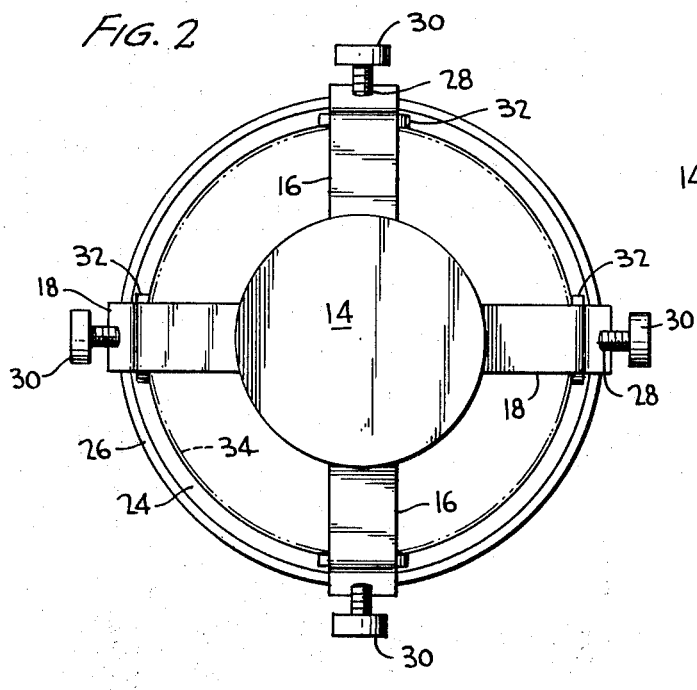
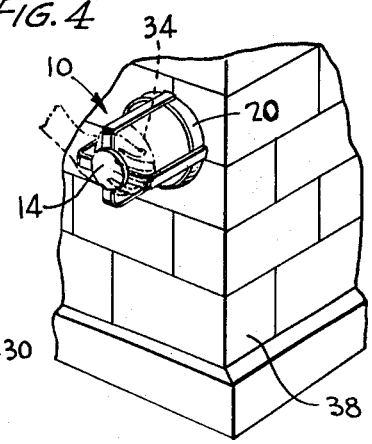
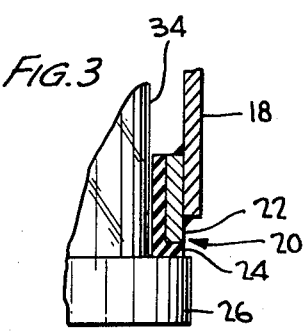
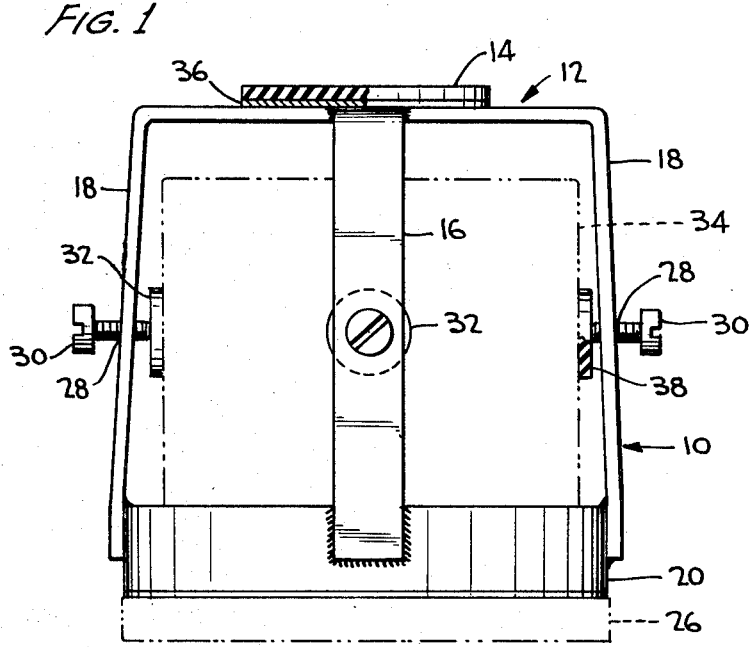
INVENTOR,
BOBBIE GENE PRICE
BY Christen, Sabol + O'Brien
ATTORNEYS

United States Patent Office 3,570,103
Patented Mar. 16, 1971

3,570,103
GLASS METER INSTALLING DEVICE
Bobbie G. Price, Cordell, Okla., assignor to Southwest
Electric Co., Oklahoma City, Okla.
Filed Nov. 12, 1968, Ser. No. 774,615
Int. Cl. B25b 11/00, 27/00
U.S. Cl. 29—270
8 Claims

ABSTRACT OF THE DISCLOSURE

A glass meter installing device having a plurality of support members extending from a platen disposed at the butt end of the device and supporting a collar adapted to abut the rim of a glass enclosed meter to be installed, and cushioning means disposed on the support members resiliently abut the glass enclosure of the meter to secure the device to the glass enclosure of the meter; the meter is disposed adjacent an installation socket and force applied to the platen is transmitted through the support members and the collar to the rim of the meter to force the meter into the socket without subjecting the glass enclosure of the meter to breakage.

BACKGROUND OF THE INVENTION

The present invention pertains to meter installing devices and more particularly to devices for use in the installing of glass enclosed meters in order to avoid breakage of the glass enclosure.

Conventional electrical meters and various other kinds of meters are glass enclosed in order to permit readings of the meter to be taken without removal of any parts of the meter. The inner mechanism of the meter is conventionally secured to an annular base to which the glass enclosure is secured by providing an annular rim encircling the open end of the glass. The base of the meter has a plurality of prongs disposed thereon which are adapted to fit into the slots in a socket which is generally disposed on an outer wall of a building in order to permit connection to a fuse box. The meter is generally installed on the exterior of the building and connects with the socket through the outer wall.

In order to install the meter, the general practice is to rotate the meter until the prongs therein are opposite the slots in the socket, and the meter is then physically forced into the socket. In order to force the prongs into the slots, it is the normal practice for the installer to hit the outwardly extending end of the glass enclosure of the meter with the palm of his hand with a sharp blow. This procedure is quite dangerous in that should the glass enclosure be slightly defective, or should the installer hit the glass too hard, the glass will break and cause serious injury to the installer's hand. Other than the physical danger involved, this method of installation is undesirable due to the expense of providing and installing a new meter when the glass enclosure of the original meter to be installed is broken.

SUMMARY OF THE INVENTION

Accordingly, it is an object of the present invention to construct a device for use in installing glass enclosed meters to prevent breakage of the glass enclosure.

Another object of the present invention is to provide a meter-encircling frame with a collar to abut a rim of a glass enclosed meter in order to permit installation of the meter without applying force to the glass enclosure.

A further object of the present invention is to utilize resilient cushioning means in a glass meter installing device to insure correct positioning of the device with respect to the meter.

The present invention has another object in that a device for installing glass enclosed meters includes resilient means for abutting the meter and resilient means for receiving the physical force necessary to install the meter.

The present invention is generally characterized in that a device for installing meters of the type having a glass enclosure secured to a base rim includes a frame having a butt end, a collar adapted to abut the rim of the meter, support means connected with the collar and the butt end for supporting the collar, and clamping means disposed on the support for contacting the glass enclosure of the meter.

Other objects and advantages of the present invention will become apparent from the following description of the preferred embodiment taken in connection with the accompanying drawings.

BRIEF DESCRIPTION OF THE DRAWING

FIG. 1 is a side elevational view with parts in section of a glass meter installing device according to the present invention.

FIG. 2 is a top view of the device of FIG. 1.

FIG. 3 is an enlarged partial view with parts in section of the collar of the device of FIG. 1 in contact with a meter.

FIG. 4 is a pictorial representation of the use of the device of FIG. 1 for installation of a meter on a wall.

DESCRIPTION OF THE PREFERRED EMBODIMENT

The glass meter installing device of the present invention will be described with respect to FIG. 1 which is a side elevation of the device and FIG. 2 which is a top view of the device.

The glass meter installing device is embodied in a frame member, indicated generally at 10, having a butt end 12 which has an annular resilient pad 14 disposed in the center thereof. The frame has a cage-like arrangement defined by a pair of generally orthogonally disposed support members 16 and 18 which are fastened together at the butt end 12 of the frame. Support members 16 and 18 are U-shaped such that they cross at right angles at butt end 12 and extend down at a slight angle from butt end 12 to engage a ring or annular collar 20. The support members may, alternatively, have an L-shape and be fastened to one another at butt end 12.

Collar 20 is formed of an annular strip of metal 22 with a ring of resilient material 24 secured on the inner surface thereof as by adhesive means; the resilient material ring 24 is L-shaped in cross section as seen in FIG. 3 which is an enlarged, broken, sectional view of collar 20 in contact with a rim 26 of a meter. Support members 16 and 18 are secured to collar 20 as by welding but, of course, the support members 16 and 18 and metal strip 22 may be interally formed from cast aluminum. The diameter of collar 20 will ordinarily be approximately 7⅛ inches, in that this is the diameter of the base of standard electric meters. However, it is within the scope of the present invention to provide a collar of any desired diameter for use with any particular meter or other glass enclosed device.

The downwardly extending legs of support members 16 and 18 each have an internally threaded bore 28 therein to receive an adjustable set screw 30; cushioning means in the form of a circular sponge rubber pad 32 is secured to the end of each set screw 30 for assuring the correct positioning of device 10 on a meter as may be best seen in FIG. 1 wherein the glass enclosure 34 of a meter is shown in dashed lines.

Pad 14 is secured to a metal platen 36 in the center of butt end 12, and platen 36 is in contact with both support members 16 and 18 such that force applied to pad 14 is transmitted through platen 36 and support members 16 and 18 to collar 20 evenly. That is, platen 36 is centered with respect to the support members so as to assure that force is transmitted to collar 20 in such a manner that tipping or uneven forces are prevented. To this end, it is clear that a greater or lesser number of support members may be utilized to form the frame as long as they are equally spaced from one another. It is recognized, of course, that if an uneven number of support members are utilized they will each have an L-shape and be fastened to one another at butt end 12.

Butt end 12 is disposed approximately seven inches above collar 20 in order to assure that the glass enclosure of a conventional electrical meter will not come in contact with butt end 12 of the device. The space between butt end 12 and the end of glass enclosure 34, as shown in FIG. 1, therefore assures that force applied to pad 14 will not be transmitted to glass enclosure 34, and obviously the length of the downwardly extending legs of the support members may be of varying lengths in order to accommodate different size meters and other devices.

The device of the present invention may be constructed of cast aluminum parts or the entire device may be cast in aluminum. Resilient pad 14 and resilient ring 24 may be constructed of rubber and are utilized to prevent unnecessary injury to person and/or meter accordingly, pad 14 and ring 24 are not basic components of the present invention but rather are refinements of the basic meter installing device.

As may be seen from FIG. 3 it is not necessary that the resilient ring 24 be in contact with the glass enclosure 34 of the meter since the device is firmly secured to the meter by the use of rubber clamping pads 32; and consequently, the diameter of collar 20 is not critical other than to assure that collar 20 has sufficient thickness to abut the rim 26 of the meter.

In utliizing the device of the present invention to install a glass enclosed meter, the device is first inserted over the meter such that resilient ring 24 abuts the upper rim 26 of the base of the meter as shown in FIGS. 1 and 3. Set screws 30 are then tightened equally in order to press pads 38 against the glass enclosure 34 of the meter in order to firmly clamp the device 10 to the meter, and after set screws 30 have been adjusted, the device 10 and the meter, which are now securely clamped together, may be placed adjacent the socket in a wall, such as shown in FIG. 4 Once the prongs in the bottom of the base of the meter are aligned with the slots in the socket, the meter may be installed by applying force to resilient pad 14. The force applied to pad 14 is transmitted through support members 16 and 18 and collar 20 to the rim 26 of the meter thereby forcing the meter into the socket without applying any pressure to the glass enclosure.

It is undesirable to apply uneven force to the meter as it is being installed in that such uneven force can cause poor contact between the meter and the socket due to bent prongs; however, as explained above, by centering platen 36 with respect to the frame of device 10 and equally spacing the support members, force applied to pad 14 is evenly transmitted by collar 20 to rim 26 of the meter to assure even force on the meter during installation.

Thus it can be seen that the device of the present invention is of simple construction and may be easily utilized to install quickly and safely a glass enclosed meter without applying pressure to the glass enclosure whereby the danger of breakage is practically eliminated.

Inasmuch as the present invention is subject to many variations, modifications and changes in detail, it is intended that all matter described in the foregoing specification or shown in the accompanying drawing shall be interpreted as illustrative and not in a limiting sense.

What is claimed is:

1. A device for installing meters of the type having a glass enclosure secured to a base rim comprising
  a frame having a butt end and a ring end adapted to abut the rim of the meter,
  said frame including support means connecting said ring end with said butt end, and
  cushioning means disposed on said support means intermediate between said butt end and said ring end for contacting the glass enclosure of the meter to attach the device to the glass enclosure of the meter whereby an installing force may be applied to said ring end without affecting the glass enclosure of the meter.

2. A device for installing meters of the type having a glass enclosure secured to a base rim comprising
  a frame having a butt end and a ring end adapted to abut the rim of the meter,
  said frame including support means connecting said ring end with said butt end, and
  cushioning means disposed on said support means for contacting the enclosure of the meter whereby an installing force may be applied to said ring end without affecting the glass enclosure of the meter,
  said cushioning means including a plurality of adjustable screws each having a resilient pad disposed on an end thereof for contacting the glass enclosure of the meter to clamp the device to the glass enclosure of the meter.

3. The device as recited in claim 2 wherein ring end includes collar means and said frame includes force receiving means disposed at the center of said butt end and in contact with said support means whereby force applied to said force receiving means is transmitted evenly to said collar means through said support means.

4. The device as recited in claim 3 wherein said force receiving means includes a flat, metal plate fastened to said support means.

5. The device as recited in claim 4 wherein said force receiving means includes a resilient pad disposed on said plate.

6. The device as recited in claim 4 wherein said collar means includes an annular strip of metal having an inner surface and a ring of resilient material secured to said inner surface of said strip of metal and adapted to abut the glass enclosure of the meter.

7. The device as recited in claim 6 wherein said ring of resilient material is L-shaped in cross section and adapted to abut the rim of the meter.

8. The device as recited in claim 6 wherein said support means includes a plurality of members each secured to said collar means and fastened to each other and said force receiving means at said butt end of said frame.

References Cited
UNITED STATES PATENTS

| | | | |
|---|---|---|---|
| 890,354 | 6/1908 | Giard | 294—32 |
| 3,456,840 | 7/1969 | McAlaster | 294—32 |

OTHELL M. SIMPSON, Primary Examiner

U.S. Cl. X.R.

81—3